Patented Feb. 6, 1934

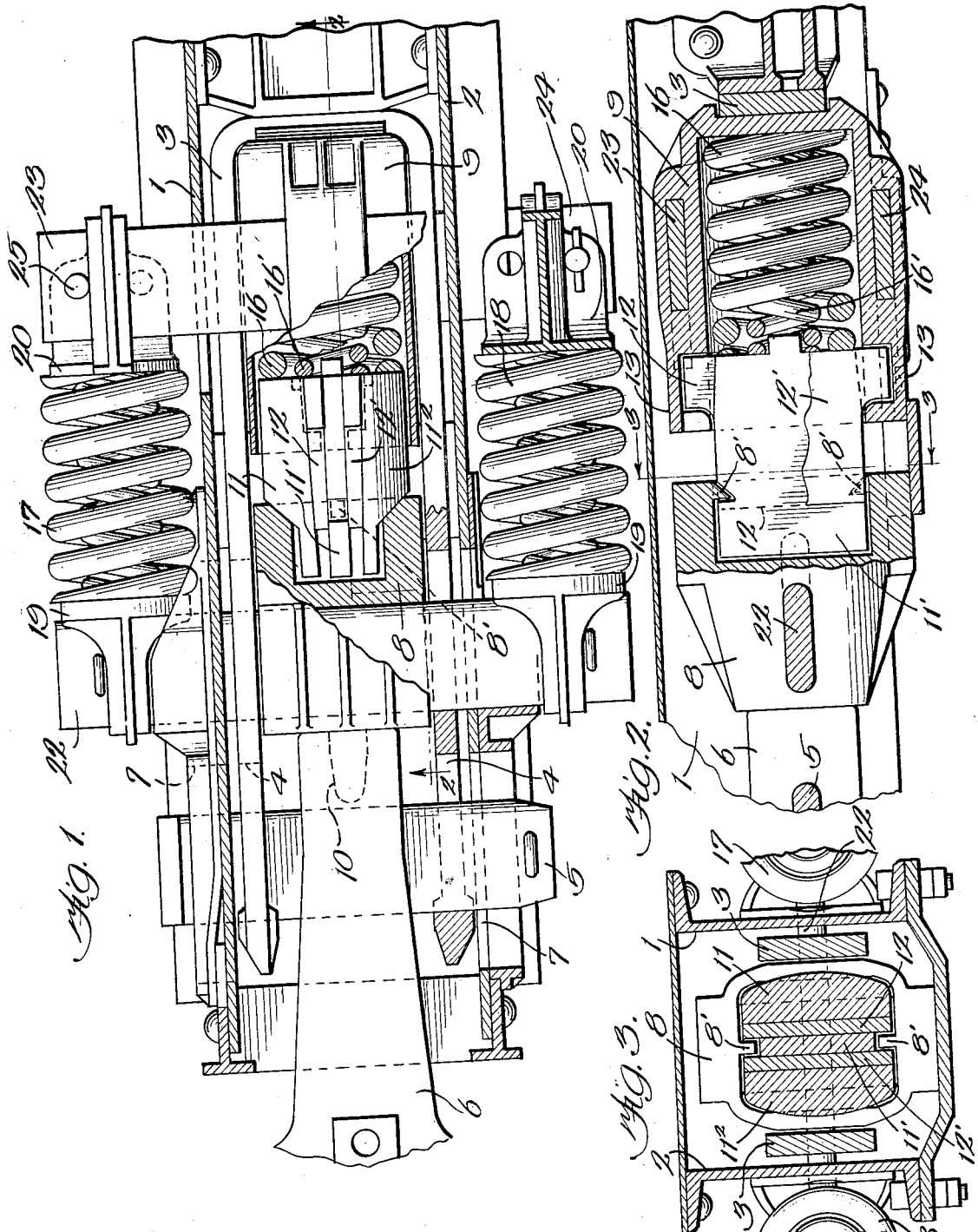

1,946,178

UNITED STATES PATENT OFFICE 1,946,178

DRAFT GEAR

Herman C. Priebe, Blue Island, Ill.; Thomas H. Taylor, administrator of said H. C. Priebe, deceased Application October 31, 1929. Serial No. 403,817

1 Claim. (Cl. 213—33)

My invention relates to draft gears for coupling cars into trains. The invention, in particular, relates to such a gear that is inclusive of followers arranged in the line of draft one subject to pulling strains and the other subject to pushing strains, these followers having motion retarding mechanism therebetween which is inclusive of intercalated friction producing elements which are pressed upon by a spring structure interposed between the intercalated elements and one of the followers for the purpose of producing motion retarding friction between the intercalated elements. Such a gear, upon which my invention is an improvement, also includes another spring structure also interposed between the followers but pressing upon the followers without the intermediation of the intercalated elements. This latter spring structure is desirably placed outside of the center sills where there is more room for its accommodation. All of the springs cooperate to retard the approach of either follower toward the other, the outer springs being particularly serviceable in spreading the followers apart toward their normal or relatively idle positions. The spring structure, of the prior device, within the space between the center sills is inclusive of a relatively light spring whose function is to press upon one of the intercalated elements to restore it into relation with the follower remote therefrom. This spring may become broken and in order that the function performed thereby may not be lost, I interengage or couple the intercalated element pressed upon thereby with the latter follower. The invention, therefore, is not to be limited to the employment of this lighter spring. The spring mechanism upon the exterior of the sills hitherto, on occasion, functioned too rapidly producing what is termed a recoil which caused a fluttering of the aforesaid intercalated element that was hitherto pressed upon by the lighter spring. This objectionable action is overcome by providing the aforesaid interengagement between this intercalated element and the follower toward which it is pressed by the light spring, such interengagement maintaining this intercalated element in such association with the balance of the intercalated elements as to produce a motion retarding friction serving to eliminate the fluttering.

I will explain my invention more fully by reference to the accompanying drawing in which Fig. 1 is a plan view partially in section illustrating a draft gear constructed in accordance with the preferred embodiment of the invention; Fig. 2 is a sectional view on line 2—2 of Fig. 1; and Fig. 3 is a sectional view on line 3—3 of Fig. 2.

The center sills 1 and 2 of a car desirably also constitute the draft sills of the gear. The coupler yoke 3 is disposed between the sills. This coupler yoke is of U form with its sides in the same horizontal plane and respectively closely approached to the center sills. The base of the coupler yoke is innermost. The outer end portions of the coupler yoke are formed with elongated slots 4. The key 5 snugly passes through a slot formed through the inner end of the coupler stem 6. The slots 4 are longer than the width of the key to permit inward movement of the key with respect to the coupler yoke during compression, the key engaging and pulling upon the coupler yoke when the coupler stem is pulled upon. The center sills are provided with slots 7 which are of sufficient length to permit the full range of movement of the key 5. The outer follower 8 and the inner follower 9 are the main followers and are provided between the center or draft sills. The outer follower 8 is formed with a pin projection 10 which is received within the inner end of the coupler stem 6.

The main motion resisting mechanism illustrated is inclusive of friction producing elements and spring means operating upon same. The friction producing means illustrated is inclusive of friction blocks 11, 11' and $11^2$, other friction blocks 12, 12' alternating with the first. The friction blocks 11, $11^2$ have abutting engagement with the follower 8, these friction blocks also having wedging engagement with this follower. The friction blocks 12 and 12' are of T form, the projecting ends of the T heads being caught by the extension 13 of the follower 9. The springs 16, 16' are interposed between the friction blocks and the follower 9, these springs being surrounded by the follower extension 13 which is in the form of a spring barrel. These springs and said friction blocks cooperate to yieldingly oppose relative movement of the followers longitudinally of the gear in response to draft strains.

Supplemental motion resisting means in the form of springs 17 and 18 are provided upon the exteriors of the sills, these springs pressing upon and being pressed upon by the spring seats 19 and 20 which constitute supplemental followers. The supplemental followers are brought into assembly with the main followers by means of the keys 22, 23 and 24. The key 22 passes snugly through the follower 8 laterally of the gear, this key being cut by the axis of the gear. The keys 23 and 24 snugly pass through lateral enlargements provided at the top and bottom of the spring barrel 13. These latter keys are thus abreast of the motion resisting means 16, 16' of the gear. The assembly of these keys 23 and 24 with the associated supplemental followers is established by means of the yokes 25 which are preferably in the form of vertical rods that are passed downwardly through the keys.

The keys viewed from the side of the gear define a triangle whose corners are determined by the three keys. Said keys, by reason of their length and relation, define a triangular prism and consequently cooperate to prevent buckling of the springs 16, 16'. This feature forms the subject matter of my copending application 333,834 filed June 21, 1929 and while the preferred form of device of my present invention includes this characteristic, the invention is not to be thus limited.

The friction producing elements 11 and 11² and the follower 8 have interengaging wedging formations which produce friction and which cause these elements to have friction producing engagement with the intercalated elements 12 and 12' and these latter elements with the central intercalated element 11'. In turn the intercalated elements 12 and 12' have friction producing engagement with the intercalated elements 11 and 11² and cause the latter two elements to have friction producing engagement with said follower. The engaging faces of the various intercalated elements are of wedging inclination with the exception of the adjacent faces of the elements 11' and 12', the element 11' being shown as a non-tapered element, the other elements tapered.

The spring 16' is employed to press upon the central element 11' in a direction to restore it to its normal or idle position with respect to the follower 8, but if the spring becomes broken it loses this function. In carrying out one of the objects of my invention I overcome this defect by means of the hooks 8' upon the follower 8 which are loosely received within notches in the central intercalated element 11'. These hooks insure the restoration of the central intercalated element 11' to its normal or idle relation with the follower 8. The interengagement or coupling afforded by the hooks 8' and the notches in the element 11' that receive them is also of service to retard the restoring action of the springs 17 and 18 and prevent their violent recoil which has hitherto caused the element 11' to flutter. By causing the element 11' to move substantially with the follower 8 friction is caused to arise, in the restoring movement, between this element and the adjacent elements 12 and 12' to slow down the restoring action of the springs 17 and 18.

Changes may be made without departing from the invention.

Having thus described my invention, I claim:

A draft gear including hollow inner and outer followers disposed mouth to mouth, said inner follower being in the form of a spring barrel; a member coupled and moving with the outer follower, said member having a notch therein receiving a hook upon the said follower; a pair of wedge shaped members one on each side of the first member coupled and moving with the inner follower; members having friction producing engagement with the outer follower in a plane oblique to the direction of movement of the outer follower and with the wedge shaped members coupled with the inner follower, said friction producing members entering the barrel forming the inner follower; a spring bottomed in the inner follower and pressing on said friction producing members, and another smaller spring bottomed in the inner follower within the first mentioned spring and pressing upon the member coupled with the outer follower, said member also entering said spring barrel.

HERMAN C. PRIEBE.